(12) United States Patent
Hayes

(10) Patent No.: US 6,418,248 B1
(45) Date of Patent: Jul. 9, 2002

(54) TRAVELING-WAVE PHOTODETECTOR

(75) Inventor: Robert R. Hayes, Calabasas, CA (US)

(73) Assignee: HRL Laboratories, LLC, Malibur, CA (US)

( * ) Notice: Subject to any disclaimer, the term of this patent is extended or adjusted under 35 U.S.C. 154(b) by 0 days.

(21) Appl. No.: 09/456,098

(22) Filed: Dec. 7, 1999

(51) Int. Cl.[7] .............................. G02B 6/00; H01J 40/14
(52) U.S. Cl. ................ 385/24; 250/227.11; 250/208.2; 385/14
(58) Field of Search .................. 385/14, 24; 250/208.1, 250/208.2, 208.3, 227.11, 214.1, 227.14; 359/189–195

(56) References Cited

U.S. PATENT DOCUMENTS

| | | | |
|---|---|---|---|
| 5,001,336 A | 3/1991 | de la Chapelle | 250/208.2 |
| 5,404,006 A * | 4/1995 | Schaffner et al. | 250/208.2 |
| 5,572,014 A * | 11/1996 | Wu et al. | 250/208.2 |

OTHER PUBLICATIONS

Goldsmith et al. "Coherent Combining of RF Signals in a Traveling–Wave Photodetector Array", IEEE Photonics Technology Letters, vol. 9, No. 7, Jul. 1997.*
Goldsmith et al. "Principles and Performance of Traveling–Wave Photodetector Arrays", IEEE Transactions on Microwave Theory and Techniques, vol. 45, No. 8, Aug. 1997.*
Lin et al. "Velocity–Matched Distributed Photodetectors with High Saturation Power and Large Bandwidth", Device Researh Conference, 1996, Digest, pp. 196–197, Jun. 24–26, 1996.*
Magel et al. "Four–element traveling wave photodetector array for high–performance analong fiber–optic links", Optical Fiber Communication, OFC '97, pp. 207–208, Feb. 16–21, 1997.*
Wu et al., "Recent Progressin in High Frequency, High Power Photodetectors", Microwave Photonics, 1998, MWP '98, pp. 237–239, Oct. 12–14, 1998.*
Hietala, V., "Traveling–Wave Photodetectors for High–Power, Large–Bandwidth Applications," IEEE Transactions on Microwave Theory and Techniques, vol. 43, No. 9, (Sep. 1995) pp. 2291–2298.
Goldsmith, Charles, L., et al. "Principles and Performance of Traveling–Wave Photodetector Arrays", IEEE Transactions on Microwave Theory and Techniques, vol. 45, No. 8, pp. 1342–1349 (Aug. 1997).

* cited by examiner

Primary Examiner—Akm E. Ullah
Assistant Examiner—Michelle R. Connelly-Cushwa
(74) Attorney, Agent, or Firm—Ladas & Parry

(57) ABSTRACT

A method and apparatus for traveling-wave photodetection. A plurality of discrete waveguide photodetectors is provided. Each discrete waveguide photodetector has a maximum detectable modulation frequency, and each is serially interconnected with all of the others. Each discrete waveguide photodetector has a length less than a quarter of a microwave wavelength at the maximum detectable modulation frequency. Each discrete waveguide photodetector provides a respective discrete waveguide photodetector output current. Each respective discrete waveguide photodetector output current is coherently summed to provide an RF output current. Respective transmission lines are provided coupling each discrete waveguide photodetector to the summer. Lengths of the respective transmission lines are adjusted to provide for current waves traveling in the respective transmission lines to arrive at the summer in phase and sum constructively. The summer can include a plurality of active devices in a common emitter configuration, the base of an active device being coupled to a respective transmission line and to ground through a terminating load. The summer can alternatively include a plurality of active devices in a common base configuration, the emitter of an active device being coupled to a respective transmission line and to ground through a terminating load.

21 Claims, 3 Drawing Sheets

TRAVELING-WAVE PHOTODETECTOR

FIELD OF THE INVENTION

This invention relates to the field of photodetectors, and, in particular, to traveling-wave photodetectors which eliminate backward wave effects, such traveling-wave photodetectors being particularly useful in modem communications systems.

BACKGROUND

Optical communication links, using either fiber or free-space as the communication medium, allow the transmission of large amounts of information over long distances. Of considerable importance is the quality of the received signal, as measured by the system's Signal-to-Noise Ratio (SNR). One way to achieve a high SNR for a conventional Intensity Modulation/Direct Detection (IMDD) link is to increase the transmitted power. Because the signal power increases quadratically with increasing optical power, while the shot noise of the detector increases only linearly, increasing the transmitter power will always increase the SNR.

One limitation to the ultimate SNR one can achieve is set by the power-handling capability of the receiving photodetector. Achieving a high power-handling capability at low communication frequencies is relatively easy: one just makes the photodetector surface larger. At microwave frequencies, however, this is problematic because a larger area means a larger capacitance, and hence a reduction in the bandwidth over which the signal can be received.

One solution to this problem is to fabricate traveling-wave photodetectors. The traveling wave structure allows one to achieve the large dissipation area needed for high power operation, while eliminating the effect of increased capacitance. However, traveling wave photodetectors also generate backward waves as well as forward waves, and this backward wave can cause either a degradation in the frequency response or, if properly terminated at the input, no frequency degradation, but a 6 dB loss in response across the entire band.

High-frequency p-i-n photodiodes are generally known. A high-power traveling-wave p-i-n photodetector using a conventional forward-backward wave structure has been fabricated and tested by a group at Sandia National Laboratories, as described in the V. M. Hietala et. al. article entitled "Traveling-wave photodetectors for high-power, large bandwidth applications", IEEE Transactions on Microwave Theory and Techniques, Vol. 43, pp. 2291–2298 (1995). This device was limited in its frequency response by trapping effects in the absorbing region and not by backward wave effects. Nevertheless, this device does presently represent the state of the art for high-power traveling wave photodetectors.

A schematic block diagram of a conventional traveling wave photodetector is shown in FIG. 1. Lightwave 10 traveling to photodetector 12 is gradually converted along the length of the device into photocurrent for load 18, such as a terminating load with the characteristic impedance $Z_O$ of the line. Photodetector 12 has an inner region 12a consisting of an optically absorbing material which is often located between two non-absorbing materials. For a p-i-n planar structure, which is often used for waveguide detectors, these materials would be the p-type and n-type layers, between which the intrinsic absorbing layer is sandwiched. The outer portion 12b consists of the metal electrodes that form the transmission line structure. The doping of the p and n-type layers is such that, at the metal-semiconductor interface, an ohmic contact is formed. This allows one to reverse-bias the p-i-n structure, so that the photo-generated charge can be swept out of the depleted intrinsic layer, into the conductive n and p layers, and subsequently into the metal electrodes. Each conversion 13 in every element dx generates both forward current wave 14 and backward current wave 16. The forward waves sum constructively if the velocity of the current (RF) wave and the optical wave are the same, a condition known as "velocity-matching". The backward wave, however, sums destructively, with the result that for sufficiently high signal frequencies or sufficiently long detectors, that part of the signal generated by the reflected backward wave is lost. This is shown in FIG. 2, wherein the response of the detector at higher frequencies is flat, but reduced by 6 dB. This variation in response can be removed by terminating the input end of the photodetector with the characteristic impedance $Z_O$ of the line. The backward wave is then absorbed in this impedance, and does not reflect back into the forward wave. The frequency response is then flat across the entire frequency range. The penalty in doing this, however, is that the response is reduced everywhere by 6 dB, and not just at the higher frequencies.

When using the conventional approach a choice must then be made between a flat frequency response and a 6 dB reduction in signal strength, or a reduced bandwidth at full signal strength. This shortcoming is due entirely to the backward-wave effect.

Therefore, there exists a need for an effective traveling-wave photodetector which eliminates backward wave effects. The present invention provides a unique solution to meet such need.

SUMMARY OF THE INVENTION

In accordance with the present invention, a traveling wave photodetector of practically unlimited length, that has no roll-off at higher frequencies or loss in response due to backward-wave effects, can be fabricated. The elimination of backward-wave effects is achieved by coherently summing the outputs of a large number of discrete waveguide photodetectors, with each of these discrete photodetectors being sufficiently short so as to avoid, in that particular photodetector, any backward wave effects. Summation can be achieved by a variety of techniques, all of which involve the use of active elements (transistors, FETs, etc). The use of active elements allows the coherent summation of all the individual currents with no restriction on bandwidth, other than that set by the response of the individual active elements.

The elimination of the backward wave effects allows practically unlimited power handling capability together with potentially unlimited bandwidth. The present invention described hereinbelow also makes the job of matching the velocities of the optical and microwave wave easier, in that the velocity matching can be performed outside of the detector. This drastically reduces the constraints on the size and thickness of the photodetectors, thereby permitting device geometries that could not be realized with the conventional approach.

The traveling-wave device in accordance with the present invention represents a technological advance that will allow the achievement of higher operating currents at high modulation frequencies, a high desirable characteristic for systems requiring high dynamic range. Potential applications are in antenna remoting, spacecraft RF interconnects, analog and digital links, and any and all applications requiring a fiber optic link having a high-spur free dynamic range.

A preferred embodiment of the invention includes a plurality of discrete waveguide photodetectors. Each discrete waveguide photodetector has a maximum detectable modulation frequency, and each is serially interconnected with all of the others. Each discrete waveguide photodetector has a length less than a quarter of a microwave wavelength at the maximum detectable modulation frequency. Each discrete waveguide photodetector provides a respective discrete waveguide photodetector output current. Each respective discrete waveguide photodetector output current is coherently summed to provide an RF output current. Respective transmission lines are provided coupling each discrete waveguide photodetector to a summer. Lengths of the respective transmission lines are adjusted to provide for current waves traveling in the respective transmission lines to arrive at the summer in phase and sum constructively. The summer can include a plurality of active devices in a common emitter configuration, the base of an active device being coupled to a respective transmission line and to ground through a terminating load. The summer can alternatively include a plurality of active devices in a common base configuration, the emitter of an active device being coupled to a respective transmission line and to ground through a terminating load.

DETAILED DESCRIPTION

Figure 1:
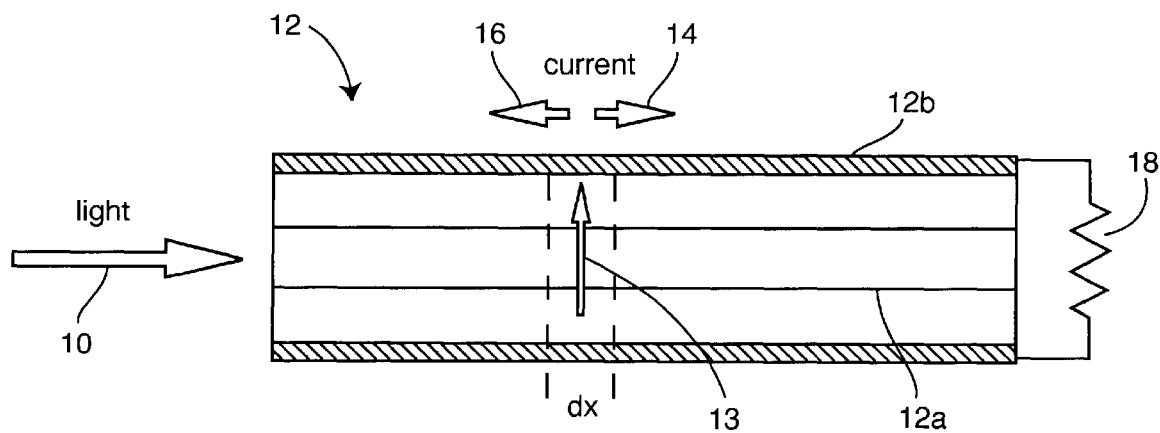
FIG. 1 shows in schematic block diagram form conventional traveling wave photodetector, depicting the generation of both the forward and backward wave.
Figure 2:
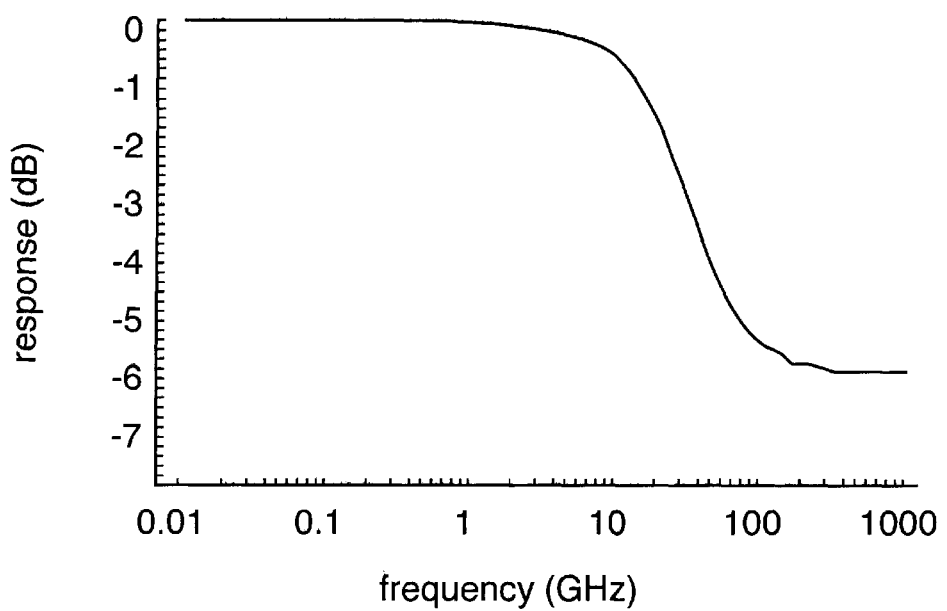
FIG. 2 shows in graphical diagram form the frequency response of a traveling-wave photodetector with no input termination for an optical absorption coefficient of 30 cm$^{-1}$.
Figure 3:
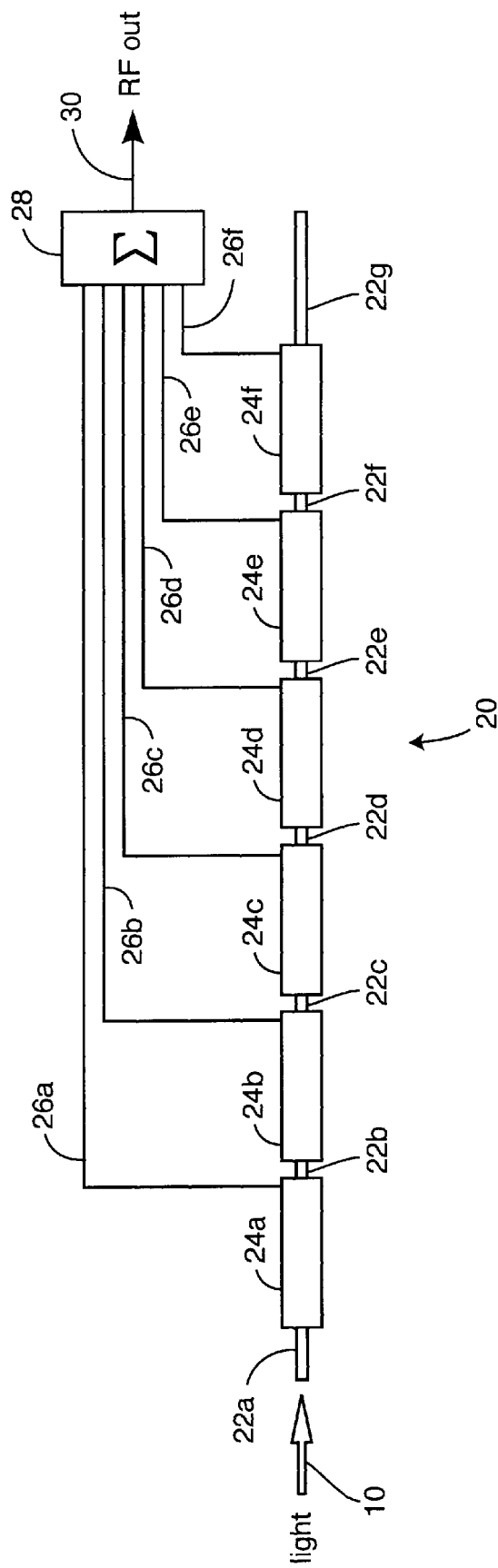
FIG. 3 shows in schematic block diagram form a coherently-summed traveling-wave photodetector apparatus in accordance with the present invention.

Referring to FIG. 3, in accordance with the present invention there is depicted a traveling wave detector 20 responsive to lightwave 10 having a wavelength that gives the appropriate absorption coefficient in the absorbing layer. Traveling wave detector 20 includes interconnecting waveguides 22a–22g and a large number of discrete waveguide photodetectors 24a–24f inserted serially inbetween. Each photodetector is made sufficiently short so that the backward wave in each device does not have time to sum destructively, nor add destructively with the forward wave. A general guideline is that the length of each device should be less than a quarter of a microwave wavelength (in the waveguide) at the highest modulation frequency that the device will detect. For example, an ensemble using InGaAs/InP p-i-n traveling wave detectors should have individual detector lengths of less than 1 mm to insure an upper frequency response of 20 GHz. By using short devices, one is operating, effectively, in the low-frequency region of FIG. 2 (although in this case the 3 dB point can be much higher because the detector section can be much shorter). Constraining the size appropriately insures that each discrete photodetector will deliver the maximum AC photocurrent generated within that detector.

The current leaving each discrete photodetector then travels along respective microwave transmission lines 26a–26f until it reaches microwave summer 28. Summer 28 takes the current wave in each transmission line, and adds it coherently to all of the other currents from the other detectors. If the line lengths are adjusted correctly the current waves will arrive in phase and sum constructively. Output current 30 will then be the total converted photocurrent.

The microwave velocity in each of the feed lines need not be the same as the lightwave velocity in the optical waveguide in order to the achieve the so-called "velocity-match" condition. The feed line lengths need merely be adjusted so that the respective time-delays correspond to the optical delay associated with each discrete detector. This is easily visualized by considering an optical pulse traveling from left to right inside the optical waveguide. This pulse will generate a current pulse in each of the detectors. To function effectively, each of these current pulses must arrive at the summer simultaneously. By correctly adjusting the line length from each detector, one achieves this time synchronization, which will be correct for all modulation frequencies.

Figure 4:
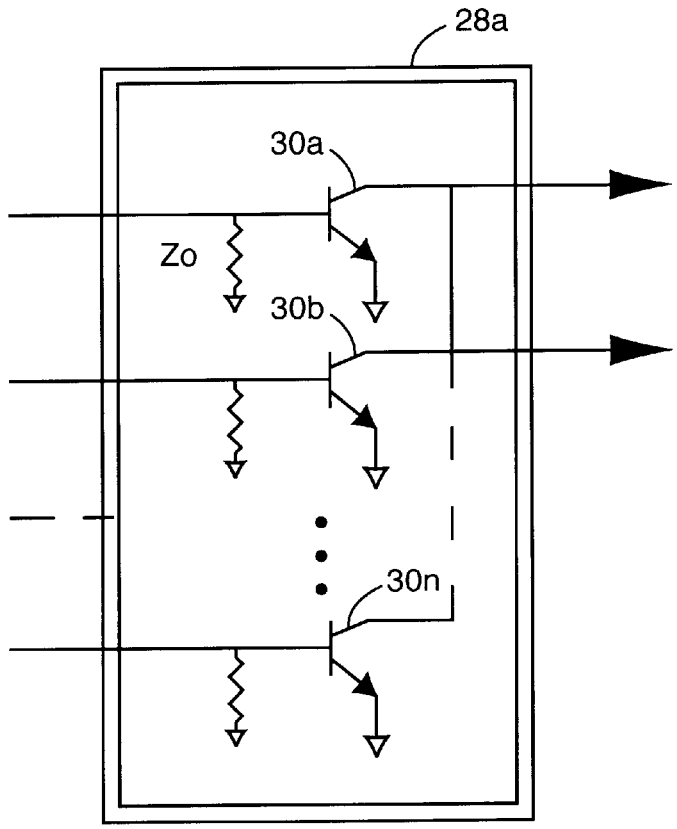
FIG. 4 shows in schematic circuit diagram form an embodiment of a summer for use in accordance with the present invention.

One embodiment of a summer for doing current summation is shown in the FIG. 4. Summer 28a includes active devices 30a–30n in a common emitter configuration, the base of an active device being coupled to a respective transmission line and to ground through a terminating load, the configuration allowing the currents to be summed over a very broad range of frequencies while maintaining both the correct input impedance, (to avoid reflections), and the correct output impedance.

Figure 5:
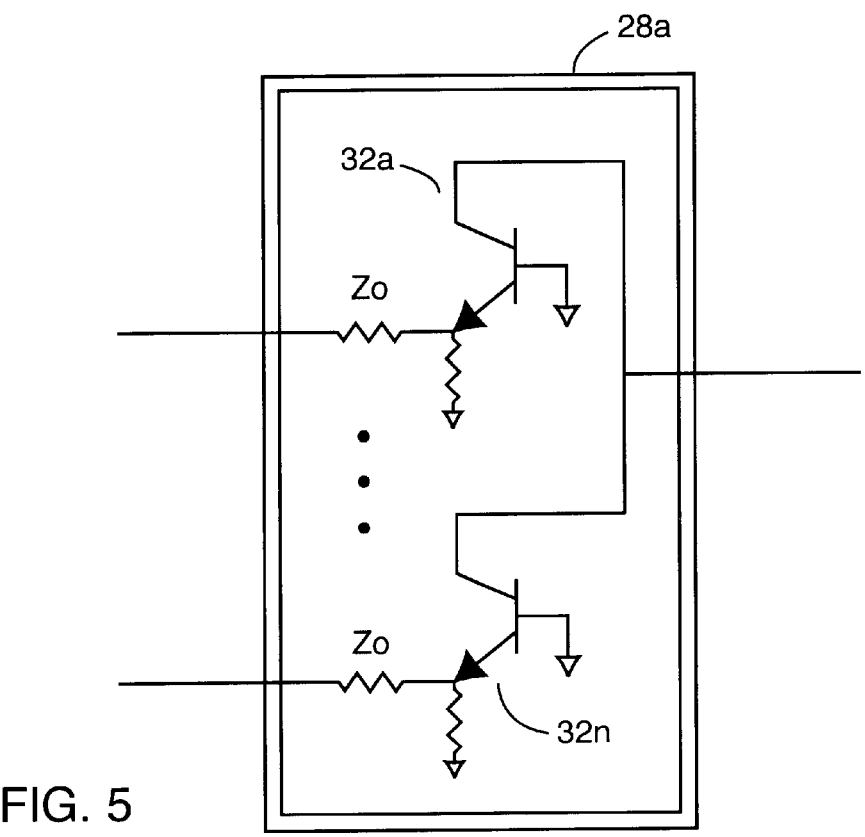
FIG. 5 shows in schematic circuit diagram form an alternative embodiment of a summer for use in accordance with the present invention.

Another embodiment of a summer for doing current summation is shown in FIG. 5. Summer 28b uses active devices 32a–32n in a common base configuration, the emitter of an active device being coupled to a respective transmission line and to ground through a terminating load, the configuration giving unity current gain, a well-defined input impedance, and a broader bandwidth.

The fundamental requirement for the summer is that it correctly terminates each of the feed lines, that it provides adequate isolation, and that it coherently sums the currents. The approaches of FIGS. 4 and 5 are offered merely as suggested embodiments.

Those skilled in the art can appreciate that alternatives or variations to the embodiment described herein can be made. Although the preferred embodiment would be one in which the detectors, interconnecting optical waveguides, and the microwave feed lines, were all fabricated monolithically in an appropriate semiconductor material, another approach would be to use individual discrete devices, and interconnect them using short pieces of discrete optical waveguide. An embedded waveguide could also be used, such as in-diffused titanium in LiNbO$_3$, and attach discrete detectors to the top of the waveguide, so that the light would couple evanescently into the detector.

What is claimed is:

1. A method of traveling-wave photodetection comprising the steps of:

providing a plurality of discrete waveguide photodetectors, each discrete waveguide photodetector having a maximum detectable modulation frequency, being serially interconnected, each discrete waveguide photodetector having a length less than a quarter of a microwave wavelength at the maximum detectable modulation frequency, each discrete waveguide photodetector providing a respective discrete waveguide photodetector output current; and coherently summing each respective discrete waveguide photodetector output current to provide an RF output current;

wherein the step of coherently summing includes the steps of providing respective transmission lines coupling each discrete waveguide photodetector to a summer; and adjusting lengths of the respective transmission lines to provide for current waves traveling in the respective transmission lines to arrive at the summer in phase and sum constructively.

2. The method of traveling-wave photodetection of claim 1, wherein the summer includes a plurality of active devices in a common emitter configuration, the base of an active device being coupled to a respective transmission line and to ground through a terminating load.

3. The method of traveling-wave photodetection of claim 1, wherein the summer includes a plurality of active devices in a common base configuration, an emitter of an active device being coupled to a respective transmission line and to ground through a terminating load.

4. The method of claim 1, further comprising the steps of: suppressing reflections of each respective discrete waveguide photodetector current; and isolating each respective discrete waveguide photodetector current.

5. The method of claim 1, wherein the summer is adapted to suppress reflections of each respective discrete waveguide photodetector current and to isolate each respective discrete waveguide photodetector current.

6. A traveling-wave photodetection apparatus comprising:

a plurality of discrete waveguide photodetectors, each discrete waveguide photodetector having a maximum detectable modulation frequency and being serially interconnected, each discrete waveguide photodetector having a length less than a quarter of a microwave wavelength at the maximum detectable modulation frequency, each discrete waveguide photodetector providing a respective discrete waveguide photodetector output current at a respective discrete waveguide photodetector output port;

a summer having a plurality of input ports, each of the plurality of input ports being coupled to a respective discrete waveguide photodetector output port, the summer providing an RF output current at a summer output port; and a plurality of respective transmission lines coupling each discrete waveguide photodetector to the summer, each of the respective transmission lines having lengths adjusted to provide for current waves traveling in the respective transmission lines to arrive at the summer in phase and sum constructively.

7. The traveling-wave photodetection apparatus of claim 6 wherein the summer includes a plurality of active devices in a common emitter configuration, a base of an active device being coupled to a respective transmission line and to ground through a terminating load.

8. The traveling-wave photodetection apparatus of claim 6 wherein the summer includes a plurality of active devices in a common base configuration, an emitter of an active device being coupled to a respective transmission line and to ground through a terminating load.

9. The method of claim 6, wherein the summer is adapted to suppress reflections of each respective discrete waveguide photodetector current and to isolate each respective discrete waveguide photodetector current.

10. A traveling-wave photodetection apparatus comprising:

a plurality of discrete waveguide photodetectors, each discrete waveguide photodetector having a maximum detectable modulation frequency and being serially interconnected, each discrete waveguide photodetector having a length less than a quarter of a microwave wavelength at the maximum detectable modulation frequency, each discrete waveguide photodetector providing a respective discrete waveguide photodetector output current at a respective discrete waveguide photodetector output port;

a summer having a plurality of input ports, each of the plurality of input ports being coupled to a respective discrete waveguide photodetector output port, the summer providing an RF output current at a summer output port, the summer including a plurality of active devices in a common base configuration, the emitter of an active device being coupled to a respective transmission line and to ground through a terminating load; and a plurality of respective transmission lines coupling each discrete waveguide photodetector to the summer, each of the respective transmission lines having lengths adjusted to provide for current waves traveling in the respective transmission lines to arrive at the summer in phase and sum constructively.

11. A traveling-wave photodetection apparatus comprising:

a plurality of discrete waveguide photodetectors, each discrete waveguide photodetector having a maximum detectable modulation frequency and being serially interconnected, each discrete waveguide photodetector having a length less than a quarter of a microwave wavelength at the maximum detectable modulation frequency, each discrete waveguide photodetector providing a respective discrete waveguide photodetector output current at a respective discrete waveguide photodetector output port;

a summer having a plurality of input ports, each of the plurality of input ports being coupled to a respective discrete waveguide photodetector output port, the summer providing an RF output current at a summer output port, the summer including a plurality of active devices in a common emitter configuration, the base of an active device being coupled to a respective transmission line and to ground through a terminating load; and a plurality of respective transmission lines coupling each discrete waveguide photodetector to the summer, each of the respective transmission lines having lengths adjusted to provide for current waves traveling in the respective transmission lines to arrive at the summer in phase and sum constructively.

12. A method of converting a modulated input optical signal into a modulated output electrical signal comprising the steps of:

tapping the modulated input optical signal at distributed locations along an optical transmission path to provide a plurality of tapped optical signals;

converting each tapped optical signal of the plurality of tapped optical signals into a corresponding tapped electrical signal;

coupling each tapped electrical signal into an input of a corresponding electrical transmission path of a plurality of electrical transmission paths;

providing a summer comprising one or more active devices;

coupling an output of each electrical transmission path into the summer so that each tapped electrical signal is received by the summer;

adjusting the length of each electrical transmission path between the input and the output to provide that the tapped electrical signals arrive at the summer in phase; and summing the tapped electrical signals with the summer to provide the modulated output electrical signal.

13. The method of claim 12, wherein the modulated input optical signal has a maximum modulation frequency and each photodetector of the plurality of serially interconnected photodetectors has a length less than a quarter wavelength of the maximum modulation frequency.

14. The method of claim 12, wherein the summer is configured to suppress reflections of the tapped electrical signals and to isolate the tapped electrical signals.

15. The method of claim 12, wherein the step of tapping the modulated input optical signal comprises coupling the modulated input optical signal into a plurality of serially interconnected photodetectors.

16. The method of claim 15 wherein each photodetector of the plurality of serially interconnected photodetectors has a length sufficiently short to prevent a backward propagating electrical wave in the photodetector from substantially destructively summing with a forward propagating electrical wave in the photodetector.

17. An optical signal to electrical signal conversion apparatus comprising:

a plurality of serially interconnected photodetectors, each photodetector of said plurality of serially interconnected photodetectors having an electrical output;

a plurality of electrical transmission lines, each electrical transmission line having an input and an output, the input of each electrical transmission line being coupled to a corresponding one photodetector of said plurality of photodetectors; and a summer comprising one or more active devices, the summer coupled to the output from each electrical transmission line, the summer summing together the electrical output from each photodetector to provide an electrical signal output and the summer being configured to suppress reflections of the electrical output from each photodetector and to isolate the electrical output from each photodetector, wherein each electrical transmission line has a length adjusted to provide for the electrical output from each photodetector to arrive at the summer in phase and to sum constructively.

18. The apparatus of claim 17, wherein each photodetector of the plurality of serially interconnected photodetectors has a length sufficiently short to prevent a backward propagating electrical wave in the photodetector from substantially destructively summing with a forward propagating electrical wave in the photodetector.

19. The apparatus of claim 17, wherein each photodetector has a maximum detectable modulation frequency and each photodetector has a length less than a quarter of a wavelength of the maximum detectable modulation frequency.

20. The apparatus of claim 17, wherein the summer comprises a plurality of active devices in a common emitter configuration, a base of an active device being coupled to a respective transmission line and to ground through a terminating load.

21. The apparatus of claim 17, wherein the summer comprises a plurality of active devices in a common base configuration, an emitter of an active device being coupled to a respective transmission line and to ground through a terminating load.

* * * * *